United States Patent
Kliger et al.

(10) Patent No.: US 10,778,645 B2
(45) Date of Patent: Sep. 15, 2020

(54) FIREWALL CONFIGURATION MANAGER

(71) Applicant: Microsoft Technology Licensing, LLC, Redmond, WA (US)

(72) Inventors: Ben Kliger, Ramat-Gan (IL); Gilad Elyashar, Tel-Aviv (IL); Moshe Israel, Ramat-Gan (IL); Michael Zeev Bargury, Tel-Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 254 days.

(21) Appl. No.: 15/634,554

(22) Filed: Jun. 27, 2017

(65) Prior Publication Data

US 2018/0375831 A1 Dec. 27, 2018

(51) Int. Cl.
*H04L 29/06* (2006.01)
*H04L 29/08* (2006.01)

(52) U.S. Cl.
CPC ...... *H04L 63/0263* (2013.01); *H04L 63/0218* (2013.01); *H04L 63/20* (2013.01); *H04L 67/10* (2013.01)

(58) Field of Classification Search
CPC . H04L 63/0218; H04L 63/0263; H04L 63/20; H04L 67/10
See application file for complete search history.

(56) References Cited

U.S. PATENT DOCUMENTS

| 8,621,618 | B1 * | 12/2013 | Ramsey | H04L 63/1408 370/392 |
|---|---|---|---|---|
| 8,938,800 | B2 | 1/2015 | Bhargava et al. | |
| 2007/0016951 | A1 | 1/2007 | Piccard et al. | |
| 2013/0247201 | A1 | 9/2013 | Alperovitch et al. | |
| 2014/0283085 | A1 * | 9/2014 | Maestas | H04L 63/0236 726/25 |
| 2015/0067764 | A1 | 3/2015 | Kim et al. | |
| 2015/0365379 | A1 | 12/2015 | Wu et al. | |
| 2016/0014081 | A1 * | 1/2016 | Don, Jr. | H04L 63/0236 726/11 |
| 2016/0088020 | A1 | 3/2016 | Chan et al. | |

(Continued)

FOREIGN PATENT DOCUMENTS

| CN | 102833111 | 12/2012 |
|---|---|---|
| CN | 102915420 | 2/2013 |

(Continued)

OTHER PUBLICATIONS

"International Search Report and Written Opinion Issued in PCT Application No. PCT/US2018/035240", dated Sep. 7, 2018, 11 Pages.

*Primary Examiner* — Joseph P Hirl
*Assistant Examiner* — Ka Shan Choy
(74) *Attorney, Agent, or Firm* — Dicke, Billig & Czaja, PLLC (57) ABSTRACT

A security configuration for a firewall is generated. Network traffic data, network reputation data, and endpoint protection data are received from a network environment. A reputation score for a network address is generated from the network traffic data and the network reputation data. An endpoint protection configuration is generated from a routine based on the network traffic data and the endpoint protection data. A set of security rules is provided from the endpoint configuration and the reputation score.

20 Claims, 4 Drawing Sheets

(56) References Cited

U.S. PATENT DOCUMENTS

2016/0191465 A1 6/2016 Thomas et al.
2016/0315911 A1* 10/2016 Gupta .................... H04L 43/12
2017/0063795 A1* 3/2017 Lian ................... H04L 63/0263

FOREIGN PATENT DOCUMENTS

| WO | 2015094372 A1 | 6/2015 |
|---|---|---|
| WO | 2016164403 | 10/2016 |

* cited by examiner

FIREWALL CONFIGURATION MANAGER

BACKGROUND

Cloud computing is a model of service delivery for enabling convenient, on-demand network access to a shared pool of configurable computing resources that can be rapidly generated and released with nominal management effort or interaction with a provider of the service. Cloud computing allows a cloud consumer to obtain computing resources, such as networks, network bandwidth, servers, processing memory, storage, applications, virtual machines, and services as a service on an elastic and sometimes impermanent basis. Cloud computing platforms and infrastructures allow developers to build, deploy, and manage and resources for applications.

SUMMARY

This summary is provided to introduce a selection of concepts in a simplified form that are further described below in the Description. This summary is not intended to identify key features or essential features of the claimed subject matter, nor is it intended to be used to limit the scope of the claimed subject matter.

Security services including firewalls attempt to reduce threats from malicious code via restricting network addresses with access to assets and resources and ports for network communication with the assets and resources. Assets and resources are often included in environments that include ever changing threats as well as legitimate or genuine communications on the network. The maintenance of firewalls in such dynamic environments, however, is complicated and difficult, and many users are not able to efficiently respond to the changes.

A security configuration for a firewall is generated to address the dynamic nature of network communications and threats. Network traffic data, network reputation data, and endpoint protection data are received from a network environment, such as for a cloud environment as well as for a specific tenant of the cloud environment. A reputation score for a network address is generated from the network traffic data and the network reputation data. An endpoint protection configuration is generated from a routine based on the network traffic data and the endpoint protection data. A set of security rules is provided from the endpoint configuration and the reputation score.

BRIEF DESCRIPTION OF THE DRAWINGS

The accompanying drawings are included to provide a further understanding of embodiments and are incorporated in and constitute a part of this disclosure. The drawings illustrate embodiments and together with the description serve to explain principles of embodiments. Other embodiments and many of the intended advantages of embodiments will be readily appreciated, as they become better understood by reference to the following description. The elements of the drawings are not necessarily to scale relative to each other. Like reference numerals designate corresponding similar parts.

DESCRIPTION

In the following Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following description, therefore, is not to be taken in a limiting sense. It is to be understood that features of the various example embodiments described herein may be combined, in part or whole, with each other, unless specifically noted otherwise.

Figure 1:
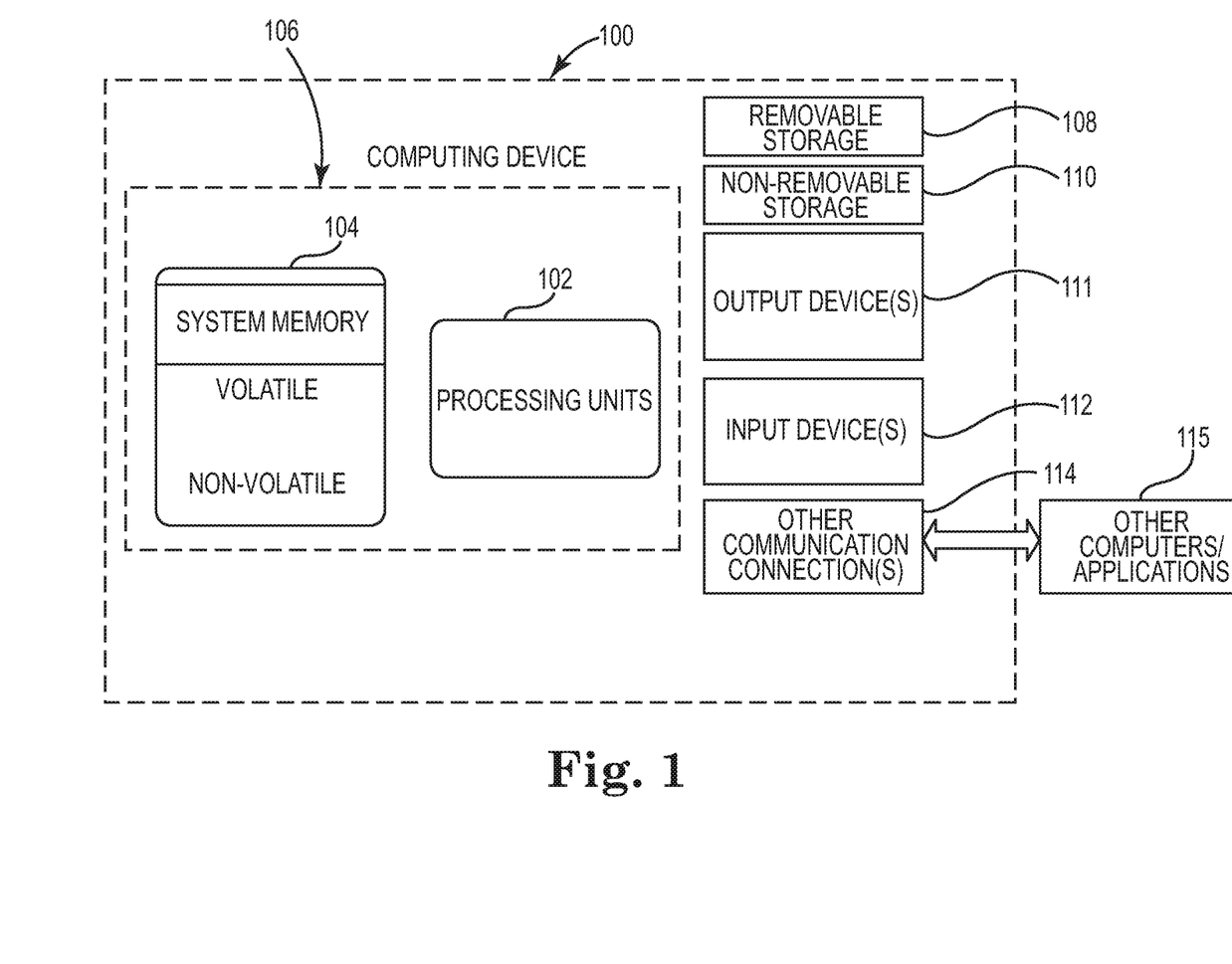
FIG. 1 is a block diagram illustrating an example of a computing device, which can be configured in a computer network to provide, for example, a cloud-computing environment.

FIG. 1 illustrates an exemplary computer system that can be employed in an operating environment and used to host or run a computer application included on one or more computer readable storage mediums storing computer executable instructions for controlling the computer system, such as a computing device, to perform a process.

The exemplary computer system includes a computing device, such as computing device 100. The computing device 100 can take one or more of several forms. Such forms include a tablet, a personal computer, a workstation, a server, a handheld device, a consumer electronic device (such as a video game console or a digital video recorder), or other, and can be a stand-alone device or configured as part of a computer network.

In a basic hardware configuration, computing device 100 typically includes a processor system having one or more processing units, i.e., processors 102, and memory 104. By way of example, the processing units may include two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), non-volatile (such as read only memory (ROM), flash memory, etc.), or some combination of the two.

Computing device 100 can also have additional features or functionality. For example, computing device 100 may also include additional storage. Such storage may be removable or non-removable and can include magnetic or optical disks, solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Accordingly, a propagating signal by itself does not qualify as storage media. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse, track pad), stylus, voice input device, touch input device (e.g., touchscreen), or other. Output devices 111 may include devices such as a display, speakers, printer, or the like.

Computing device 100 often includes one or more communication connections 114 that allow computing device 100 to communicate with other computers/applications 115. Example communication connections can include an Ethernet interface, a wireless interface, a bus interface, a storage area network interface, and a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the Internet, or other network.

In one example, a one or more of computing devices 100 can be configured as servers in a datacenter to provide distributed computing services such as cloud computing services. A data center can provide pooled resources on which customers or tenants can dynamically provision and scale applications as needed without having to add servers or additional networking. The datacenter can be configured to communicate with local computing devices such used by cloud consumers including personal computers, mobile devices, embedded systems, or other computing devices. Within the data center, computing device 100 can be configured as servers, either as stand alone devices or individual blades in a rack of one or more other server devices. One or more host processors, such as processors 102, as well as other components including memory 104 and storage 110, on each server run a host operating system that can support multiple virtual machines. A tenant may initially use one virtual machine on a server to run an application. The datacenter may activate additional virtual machines on a server or other servers when demand increases, and the datacenter may deactivate virtual machines as demand drops.

Datacenter may be an on-premises, private system that provides services to a single enterprise user or may be a publicly (or semi-publicly) accessible, distributed system that provides services to multiple, possibly unrelated customers and tenants, or may be a combination of both. Further, a datacenter may be a contained within a single geographic location or may be distributed to multiple locations across the globe and provide redundancy and disaster recovery capabilities. For example, the datacenter may designate one virtual machine on a server as the primary location for a tenant's application and may activate another virtual machine on the same or another server as the secondary or back-up in case the first virtual machine or server fails.

A cloud-computing environment is generally implemented in one or more recognized models to run in one or more network-connected datacenters. A private cloud deployment model includes an infrastructure operated solely for an organization whether it is managed internally or by a third-party and whether it is hosted on premises of the organization or some remote off-premises location. An example of a private cloud includes a self-run datacenter. A public cloud deployment model includes an infrastructure made available to the general public or a large section of the public such as an industry group and run by an organization offering cloud services. A community cloud is shared by several organizations and supports a particular community of organizations with common concerns such as jurisdiction, compliance, or security. Deployment models generally include similar cloud architectures, but may include specific features addressing specific considerations such as security in shared cloud models.

A hybrid cloud is a deployment model that includes two or more clouds, such as private clouds, public clouds, and community clouds or combinations of two or more of each deployment model, that remain unique entities. Hybrid clouds include technology to bind together the two or more clouds, and in some examples permit data and application portability across clouds, such as cloud bursting for load balancing, and service interoperability.

Cloud-computing providers generally offer services for the cloud-computing environment as a service model provided as one or more of an infrastructure as a service, platform as a service, and other services including software as a service. Cloud-computing providers can provide services via a subscription to tenants or consumers. For example, software as a service providers offer software applications as a subscription service that are generally accessible from web browsers or other thin-client interfaces, and consumers do not load the applications on the local computing devices.

Infrastructure as a service providers offer consumers the capability to provision processing, storage, networks, and other fundamental computing resources where the consumer is able to deploy and run software, which can include operating systems and applications. The consumer generally does not manage the underlying cloud infrastructure, but generally retains control over the computing platform and applications that run on the platform.

Platform as a service providers offer the capability for a consumer to deploy onto the cloud infrastructure consumer-created or acquired applications created using programming languages, libraries, services, and tools supported by the provider. In some examples, the consumer does not manage or control the underlying cloud infrastructure including network, servers, operating systems, or storage, but has control over the deployed applications and possibly configuration settings for the application-hosting environment.

In other examples, the provider can offer a combination of infrastructure and platform services to allow a consumer to manage or control the deployed applications as well as the underlying cloud infrastructure. Platform as a service providers can include infrastructure, such as servers, storage, and networking, and also middleware, development tools, business intelligence services, database management services, and more, and can be configured to support the features of the application lifecycle including one or more of building, testing, deploying, managing, and updating.

Figure 2:
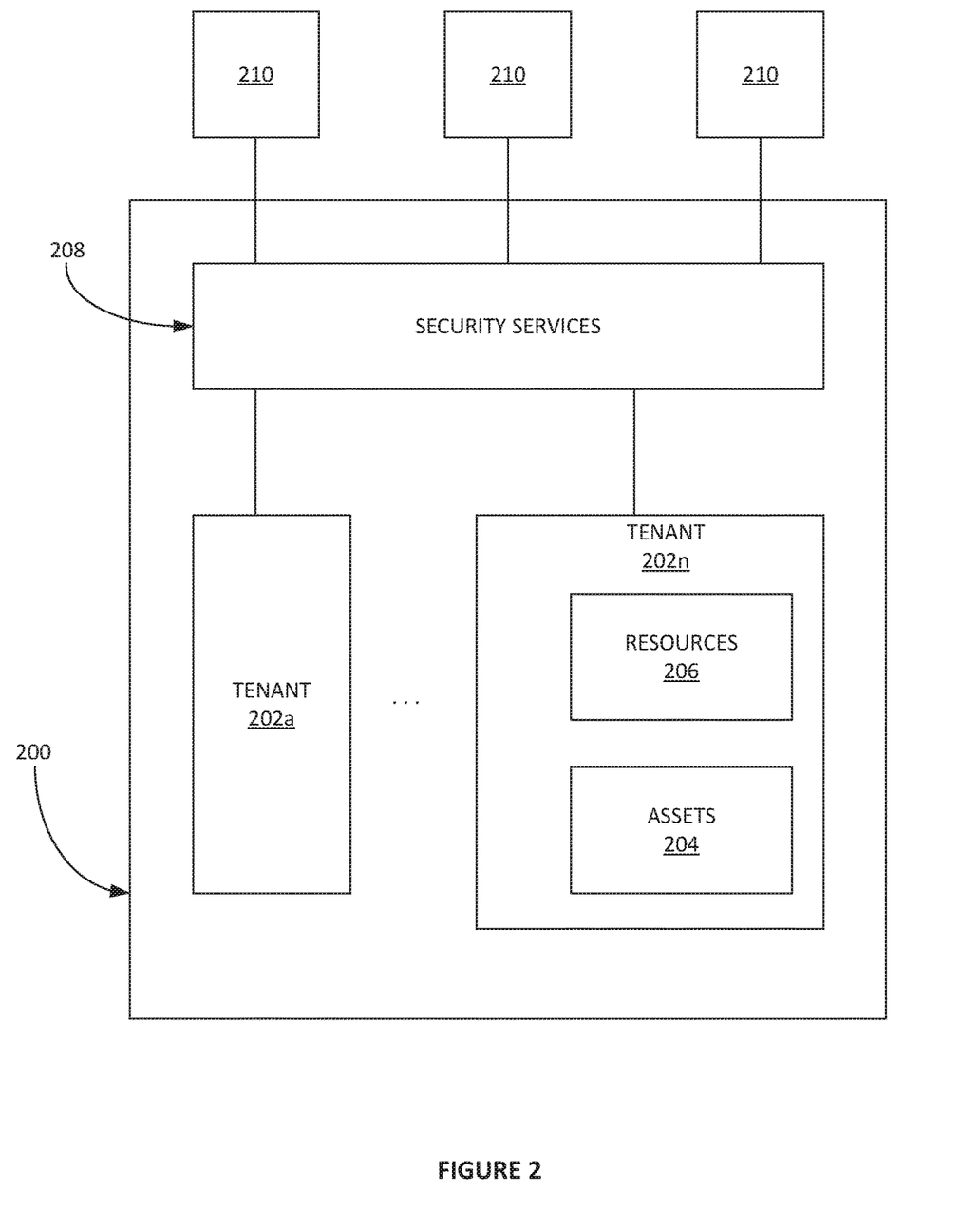
FIG. 2 is a schematic diagram illustrating an example a cloud-computing environment.

FIG. 2 illustrates an example a cloud-computing environment 200, such as a public cloud, to deploy applications and data on a platform and infrastructure across selected datacenters. In the illustrated example, the environment 200 can provided capability to a cloud tenant 202, such as one or more cloud tenants 202a-202n, to deploy applications and data as cloud-based assets 204 to the cloud computing environment 200 and address infrastructure issues. The environment 200 includes, or includes access to, resources 206 available from one or more resource providers. A resource 206 can include a component of the application to be provisioned in a platform subscription and provides an item of the platform solution. Examples of resources 206 can include virtual machines, databases, virtual networks, and others. Resources 206 can be user-managed entities, entities automatically managed by a platform with the cloud environment 200, or a combination of user-managed and automatically managed entities. Resource providers include services that provide resources for the cloud-based assets 204. Resource providers include services to create, configure, and manage operations for working with the resource 206. Examples of resource providers include a compute provider to supply a virtual machine resource, storage provider to supply a storage account resource, web provider to supply resources related to web applications, and other resource providers.

Cloud tenants 202a-202n typically can communicate with other devices, including each other or with devices 210 located outside the cloud environment 200 via a network, such as the internet. In one example the cloud tenants 202a-202n can communicate with other devices via assigned network addresses, such as an assigned internet protocol (IP) addresses.

Cloud environment 200 also includes security services 208 to protect and secure the cloud-based assets 204 and resources 206 from malicious communication or other threats. In one example, the security services 208 can include controls to manage and configure the security of the assets 204 and resources 206 in order to customize the security for the tenants 202a-202n. Security services 208 can include isolation features to prevent unauthorized or unintentional transfer of data between deployments of a multi-tenant architecture. Additionally, security services 208 can include network and endpoint protection in the form of firewalls and virtual firewalls. For example, security services 208 can include a network group virtual firewall feature to control network traffic to instances of virtual machines. A network group can include access control rules that allow or deny traffic based on direction, protocol, source address and port, and destination address and port. One or more firewalls, including virtual firewalls, can filter packets based on rules provided for or programmed into a packet filter. Security services 208 can also include access lists that control which devices are allowed access to virtual machines. Additionally, security service 208 can provide for logging and monitoring events including security-related events with agents on each compute, storage, or fabric node in environment.

In one example, attackers attempt to gain access to comprised machines within the cloud environment 200 via leveraging vulnerabilities of open ports. Security services 208 can create and maintain a dynamic list of open ports and allowed incoming network addresses and configure the firewalls to protect the assets 204 and resources 206. The dynamic lists are continuously or periodically updated and maintained. Traditional network and endpoint firewalls are often initially configured with factory settings, and the management of such lists to update the firewalls is often the responsibility of the cloud tenant. The traditional creation and management of the firewall configurations presents a large overhead and presents risks for inadvertently exposing vulnerabilities.

Figure 3:
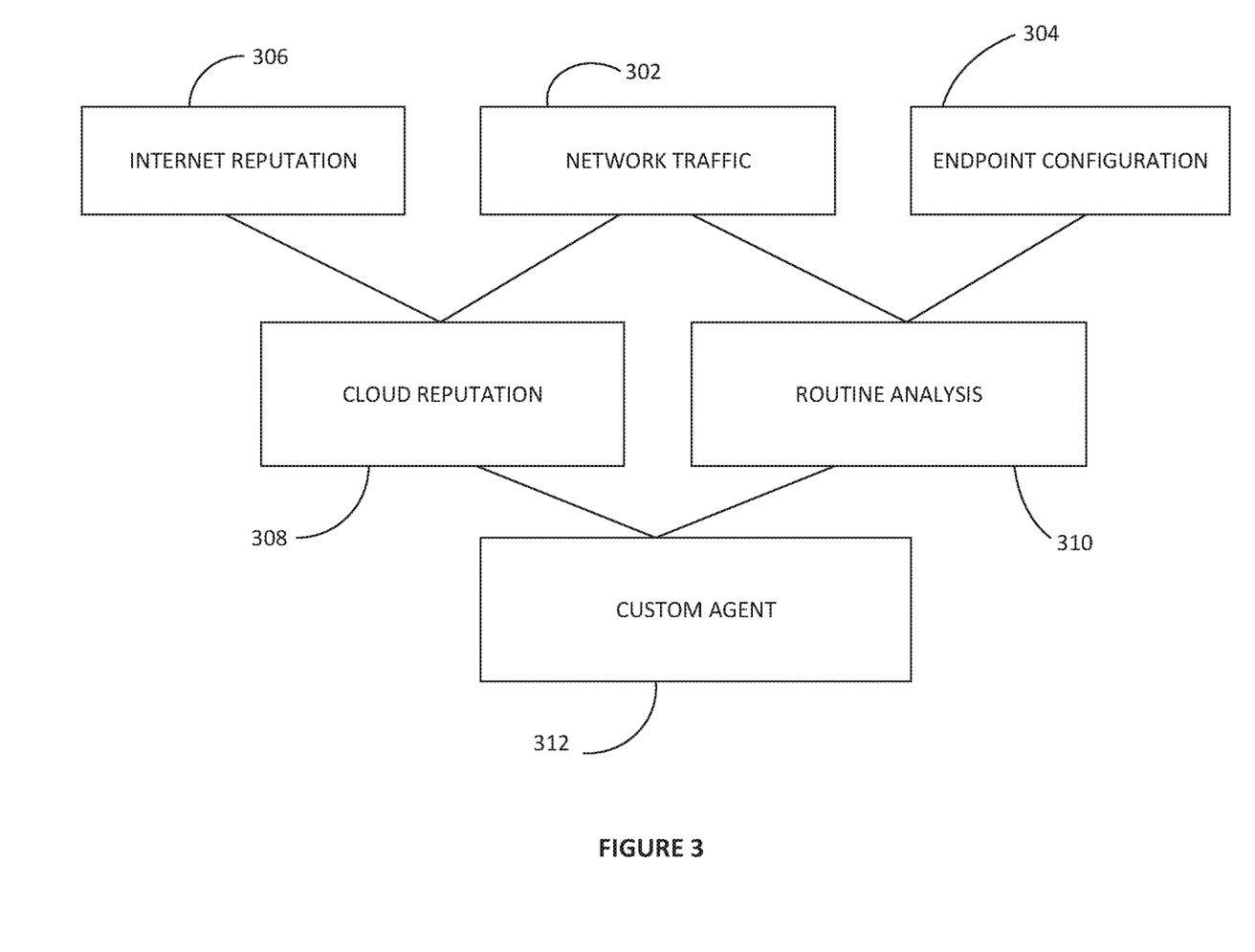
FIG. 3 is a schematic diagram illustrating an example firewall configuration manager, which can be included as a service in the cloud computing environment of FIG. 2.

FIG. 3 illustrates an example firewall configuration manager 300, which, in one example, can be implemented within a firewall as part of the security services 208. Firewall configuration manager 300 can be applied to create and maintain configurations of both network and endpoint firewalls and virtual firewalls. In one example, firewall configuration manager 300 can be implemented as part of an infrastructure or platform as a service such as for a cloud tenant 202a, 202n. In another example, firewall configuration manager 300 can be implemented as a software as a service such as for subscribers in other clouds, hybrid clouds, or private networks.

Firewall configuration manager 300 includes components to collect network traffic data 302, endpoint protection configuration data 304, and internet reputation data 306. Network traffic data 302 and internet reputation data 306 are provided to a cloud reputation component 308. Network traffic data 302 and endpoint configuration data 304 are provided to a routine analysis component 310. The cloud reputation component 308 and the routine analysis component 310 receive and analyze multiple types of data to determine meaningful insights on the relations between IP addresses and a network-connected device or organization, such as cloud tenant 202a, 202n. The cloud reputation component 308 and the routine analysis component 310 provide the insights to a customer-tailored agent 312, which combines the insights into a custom agent for each device or organization and is able to predict and suggest configurations for that device or organization.

Figure 4:
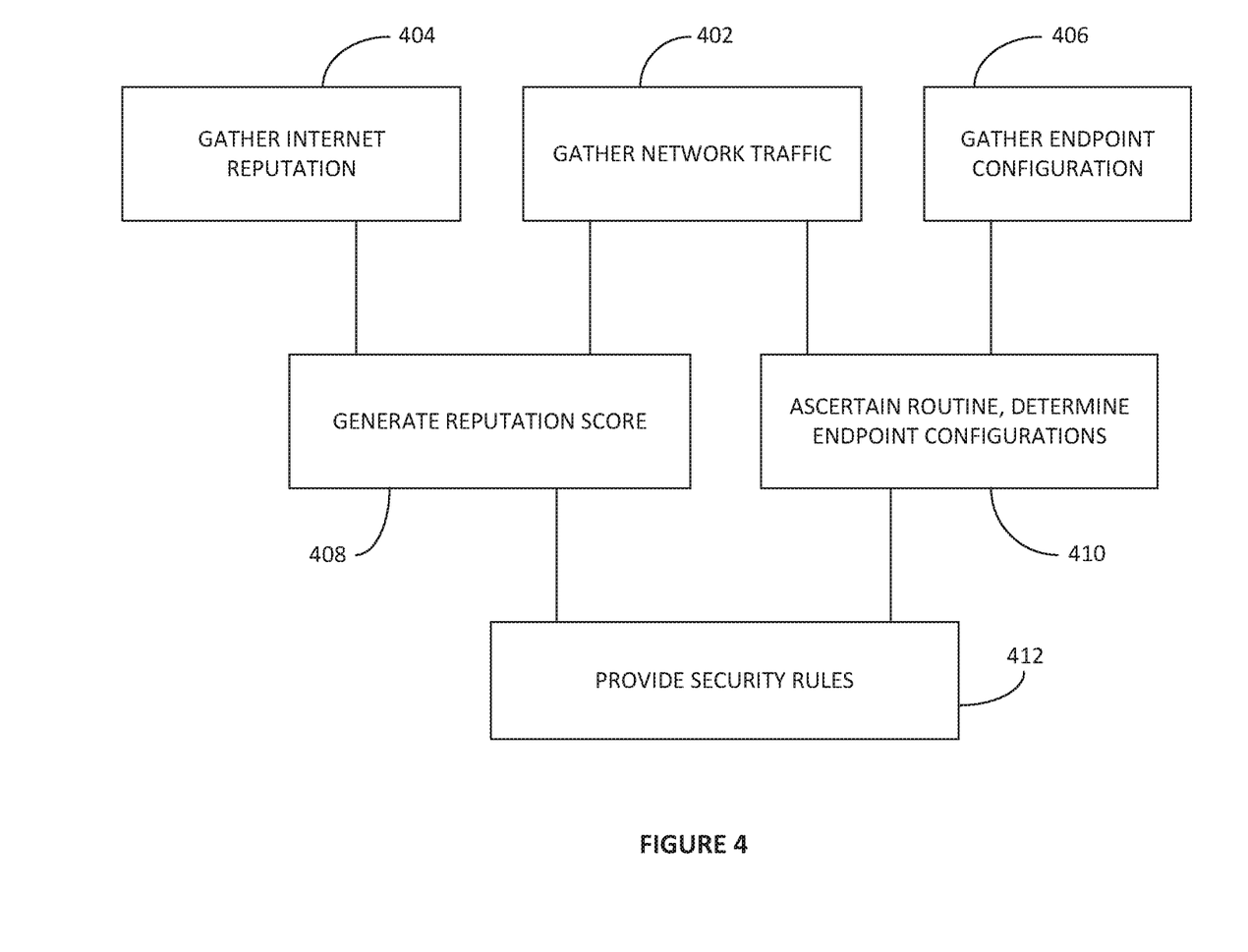
FIG. 4 is a block diagram illustrating an example method of the configuration manager of FIG. 3.

FIG. 4 illustrates an example method 400 for use with the configuration manager 300. In the example, network traffic data is gathered at 402, such as with the network traffic component 302, and provided to the cloud reputation component 308 and the routine analysis component 310. Examples of gathering the network traffic data at 402 include recording or sampling packets and flows of network traffic. Examples of collected data include timestamps, payload size, source IP address of the traffic, destination IP address of the traffic, source ports, destination ports, protocol used, and other information. The data can be gathered from internal and external network traffic from on premises environments, network traffic from within a virtual private network, network traffic within the cloud environment, and network traffic from the cloud environment and the internet, which can be collected in logs of the cloud environment 200.

Internet reputation data is gathered at 404, such as with the internet reputation data component 306, and provided to the cloud reputation component 308. Internet reputation data includes sources to provide insights into the behavior of a selected IP address on the internet and can include raw data as well as analysis. Examples of internet reputation data includes search engine index, which can provide raw data and analysis over the address to expose different types of services. Internet reputation data can also be received from threat intelligence providers, which can include data and analysis regarding addresses that have performed malicious actions, and such addresses can be tagged as unapproved for communication with tenants 202a-202n. Still further, internet reputation data can include information from Domain Name System (DNS) records, such as the address owner, other addresses of the owner, and additional information regarding the owner, purchase of the address and the address.

Additionally, data regarding endpoint protection configurations are gathered at 406, such as with the endpoint configuration data component 304, and provided to the routine analysis component 310. Endpoint configuration data provides insights into the security rules used by the tenants, such as which addresses are allowed and denied and the types of rules that are applied. Endpoint configuration data can include information regarding firewall configurations and data regarding particular inbound and outbound rules configured for the devices and the network. Endpoint configurations data can also include cloud environment or cloud provider security configurations, such as cloud-provided endpoint protection or firewall rules.

The network traffic, such as data from component 302, and internet reputation, such as data such as from component 306, are analyzed to generate a reputation score at 408. In one example, a reputation score is generated for each IP address communicating with the tenant 202 and cloud environment 200. The reputation score integrates many different aspects of the nature of the address, including as the breadth of the communication of that address across the internet, such as determined from the communication of the address with the cloud environment 200. Also, the reputation score in based on the different protocols the address uses for communication and time periods the address communicates with the tenant 202 or cloud environment 200. Still further, the reputation score can consider how the address distributes communication, such as the servers, time frames, and ports used for communications. Further, the generating the reputation score at 408 can include learning the data or inputs that provide an accurate assessment of the reputation score, such as which of the data accurately predicts the score, to allow for relatively lower cost generation of a score for the addresses. The reputation score corresponds with a level of likelihood that the address is allowed to access the tenant 202.

The network traffic, such as data from component 302, and endpoint configurations, such as data from component 304, are analyzed to ascertain the tenant's routine and determine selected endpoint protection configurations at 410. Analysis of the tenant's routine at 410 is performed to understand and model the behavior of the tenant's deployment 202 in the cloud environment 200. A tenant's routine can be determined from network traffic data and the amount, diversity, and variance of communications between the tenant and the IP addresses. For example, a tenant's routine and genuine communication with addresses is distinct and separated from noise that is created other network communications such as with scanners and bots at 410. The tenant's routine can also be used to generate a routine score for each IP address. The routine score corresponds with a level of likelihood that the address is allowed to access the tenant 202.

The multiple tenants 202a-202n in the cloud environment will generate different routines, and the multiple routines will correspond with the multiple configurations of security rules. One or more of these configurations can be encapsulated within a security rule template. The multiple configurations of the security rules can include such diverse factors as multiple rules for a given port, and multiple rules and exceptions for specific uses for addresses. The multiple rules can be included as a set of multiple security rule templates, which are included in the selected endpoint protections at 410.

The reputation score generated at 408 and the endpoint protections generated at 410 are combined, such as the custom tailored agent 312, to provide automatic security rules for each tenant at 412. For example, the custom tailored agent 312 can combine the reputation score from 408 and the routine score from 410 to provide a final score that corresponds with a level of likelihood that the address is allowed to access the tenant 202. From the final score, the addresses that are likely to be allowed to the tenant 202 can be encapsulated with a security rule template generated at 410. In one implementation, the custom tailored agent 312 feeds the reputation score and the routine score into a statistical or machine learning device, and predicts firewall configurations corresponding with a security rule template from the set of security rule templates. In one example, the tenant is able to modify the security rules of the security rule template such as to allow or deny access of selected addresses or whether to use the security rules template altogether.

In one example, the automatic security rules provided at 412, such as with the custom tailored agent 312, create access lists of approved network addresses that can communicate with the cloud tenants 202. Access lists can include a list of approved network addresses specifically approved or a list of blocked network addresses that are not allowed to communicate with a cloud tenant 202a, 202n. In one example, the cloud reputation component 308 and routine analysis component 310 can be implemented to aggregate allowed, or blocked, network addresses to determine ranges of addresses that can be allowed or blocked rather than including each network address in the access list.

The example configuration manager 300 and method 400 can be implemented to include a combination of one or more hardware devices and computer programs for controlling a system, such as a computing system having a processor and memory, to perform method 400 to generate a security configuration for a firewall. For instance, configuration manager and method 400 can be implemented as a computer readable medium or computer readable device having set of executable instructions for controlling the processor to perform the method 400. The configuration manager 300 and method 400 can be included as a service in a cloud environment and implemented on a computing device 100 in a datacenter.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method of generating a security configuration for a firewall, the method comprising:
   receiving network traffic data of communications in a network environment of a network tenant, network reputation data, and endpoint protection data from the network environment including the network tenant;
   generating a reputation score for a network address communicating with the network tenant of a plurality of network addresses communicating with the network tenant, the reputation score generated from the network traffic data and the network reputation data;
   generating an endpoint protection configuration from a routine of the network tenant on the network environment based on the network traffic data and the endpoint protection data including rules of the network tenant, the routine determined from an amount and variance of communication between the network tenant and the plurality of network addresses; and providing a set of security rules from the endpoint configuration and the reputation score.

2. The method of claim 1 wherein the generating a reputation score includes generating a plurality of reputation scores corresponding with a plurality of network addresses.

3. The method of claim 1 wherein the generating an endpoint protection configuration includes generating a plurality of security rule templates in a set of security rule templates.

4. The method of claim 3 wherein the providing a set of security rules includes selecting a security rule template from the set of security rule templates.

5. The method of claim 1 wherein the generating the endpoint protection configuration includes generating a routine score for the network address from the routine.

6. The method of claim 5 wherein the providing the set of security rules includes combining the reputation score and the routine score.

7. The method of claim 1 wherein the network environment includes a cloud environment having a plurality of tenants.

8. The method of claim 7 wherein providing the set of security rules includes providing a set of tenant-modifiable security rules.

9. The method of claim 1 wherein network reputation data includes data and analysis.

10. The method of claim 1 wherein endpoint protection data includes firewall configurations in the network environment.

11. A computer readable storage device to store computer executable instructions to control a processor to:

generate a reputation score for a network address communicating with a tenant on a network environment of a plurality of network addresses communicating with the tenant, the instructions to generate a reputation score from network traffic data of communications of the tenant in the network environment and network reputation data;

generate an endpoint protection configuration from a routine of the tenant on the network environment based on the network traffic data and endpoint protection data including rules of the tenant, the routine determined from an amount and variance of communication between the tenant and the plurality of network addresses; and provide a set of security rules from the endpoint configuration and the reputation score.

12. The computer readable storage device of claim 11 wherein the network traffic data includes timestamps, payload size, source network address, destination network address, ports, and protocols.

13. The computer readable storage device of claim 11 wherein network reputation data includes data received from threat intelligence providers.

14. The computer readable storage device of claim 11 wherein the endpoint protection configuration includes a plurality of security rule templates in a set of security rule templates.

15. The computer readable storage device of claim 14 wherein the endpoint protection configuration includes a routine score for the network address from the routine.

16. The computer readable storage device of claim 11 wherein the set of security rules includes a set of tenant-modifiable security rules.

17. A system, comprising:

a memory device to store a set of instructions; and a processor to execute the set of instructions to:

generate a reputation score for a network address communicating with a tenant on a network environment of a plurality of network addresses communicating with the tenant, the instructions to generate a reputation score from network traffic data of communications of the tenant in the network environment and network reputation data;

generate an endpoint protection configuration from a routine of the tenant on the network environment based on the network traffic data and endpoint protection data including rules of the tenant, the routine determined from an amount and variance of communication between the tenant and the plurality of network addresses; and provide a set of security rules from the endpoint configuration and the reputation score.

18. The system of claim 17 comprising:

a firewall configuration manager.

19. The system of claim 18 wherein the firewall configuration manager is included in a cloud environment.

20. The system of claim 19 wherein the firewall configuration manager is implemented as a security service in the cloud environment.

* * * * *